(12) United States Patent
Faur et al.

(10) Patent No.: US 12,191,131 B2
(45) Date of Patent: Jan. 7, 2025

(54) ULTRA LOW NOISE FLOATED HIGH VOLTAGE SUPPLY FOR MASS SPECTROMETER ION DETECTOR

(71) Applicant: DH Technologies Development PTE. LTD., Singapore (SG)

(72) Inventors: Manuel Faur, Richmond Hill (CA); Ernesto Gradin, York (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 485 days.

(21) Appl. No.: 17/762,247

(22) PCT Filed: Sep. 24, 2020

(86) PCT No.: PCT/IB2020/058950
§ 371 (c)(1),
(2) Date: Mar. 21, 2022

(87) PCT Pub. No.: WO2021/059194
PCT Pub. Date: Apr. 1, 2021

(65) Prior Publication Data
US 2022/0384170 A1 Dec. 1, 2022

Related U.S. Application Data

(60) Provisional application No. 62/905,029, filed on Sep. 24, 2019.

(51) Int. Cl.
*H01J 49/02* (2006.01)
*H02M 1/14* (2006.01)
(52) U.S. Cl.
CPC ............ *H01J 49/022* (2013.01); *H02M 1/14* (2013.01)

(58) Field of Classification Search
CPC .......... H01J 49/00; H01J 49/02; H01J 49/022; H01J 49/025; H02M 1/14; H02M 1/12; H02M 1/44
(Continued)

(56) References Cited

U.S. PATENT DOCUMENTS 5,773,822 A 6/1998 Kitamura et al.
8,890,086 B1 * 11/2014 Goldberg .............. H01J 43/246
250/397

(Continued)

OTHER PUBLICATIONS

International Search Report mailed Dec. 2, 2020 in corresponding PCT App. No. PCT/IB2020/058950 (3 pages).

(Continued)

*Primary Examiner* — Jason L McCormack
(74) *Attorney, Agent, or Firm* — Potomac Law Group, PLLC; Reza Mollaaghababa; Brian Hairston

(57) ABSTRACT

A high-voltage power supply system for a mass spectrometer comprises a ground-referenced power supply with a first transformer having a primary winding and a secondary winding, the primary winding is electrically coupled to a first source of AC power, and a floated bias voltage power supply with a second transformer having a primary winding and a secondary winding, the primary winding of the second transformer is electrically coupled to a second source of AC power. A return electrical path of the floated bias voltage power supply is electrically coupled to the ground-referenced power supply to bias an output voltage of the ground-referenced power supply. A floating shield is around the floating bias voltage power supply, and at least one resistive element is in the return electrical path of the floated bias voltage power supply to reduce noise coupled from the floated bias voltage power supply to the ground-referenced power supply.

20 Claims, 4 Drawing Sheets

(58) Field of Classification Search
USPC .................................................. 250/281, 282
See application file for complete search history.

(56) References Cited

U.S. PATENT DOCUMENTS

2018/0366296 A1* 12/2018 Nishimoto ............ H01J 37/244
2020/0035458 A1* 1/2020 Ziemba ............. H01J 37/32174

OTHER PUBLICATIONS

Written Opinion of the International Searching Authority mailed Dec. 2, 2020 in corresponding PCT App. No. PCT/IB2020/058950 (7 pages).

* cited by examiner

FIG. 1

ULTRA LOW NOISE FLOATED HIGH VOLTAGE SUPPLY FOR MASS SPECTROMETER ION DETECTOR

RELATED APPLICATIONS

This application is the national stage of International Application No. PCT/IB2020/058950 filed on Sep. 24, 2020, entitled "Ultra Low Noise Floated High Voltage Supply for Mass Spectrometer Ion Detector," which claims priority to U.S. provisional application No. 62/905,029 filed on Sep. 24, 2019, entitled "Ultra Low Noise Floated High Voltage Supply for Mass Spectrometer Ion Detector," which are incorporated herein in their entireties.

BACKGROUND

The present disclosure is generally directed to systems and methods for reducing noise coupling between two high-voltage power supplies, and more particularly for reducing noise coupling between a floated bias voltage power supply and a ground-referenced voltage power supply employed in mass spectrometry systems.

High-voltage power supplies are employed in mass spectrometry systems to apply voltages to various components of the system. By way of example, high voltage power supplies are employed in mass spectrometry systems for applying bias voltages to ion detectors of such systems. In some configurations, a floated high-voltage power supply is electrically coupled to a ground-referenced power supply such that the floated high-voltage power supply biases the output voltage of the ground-referenced power supply. In conventional designs of such configurations, current ripples can flow from the secondary winding of the floated high-voltage power supply to an output capacitor of the ground-referenced power supply, inducing ripple voltage at the output. Such ripple voltage can increase the noise in the ion detector, thus adversely affecting the signal-to-noise ratio for ion detection.

Accordingly, there is a need for methods and systems for reducing noise in high voltage power supplies, and particularly to such methods and systems that can be employed to reduce noise between two high-voltage power supplies in an electrically floated configuration with applications to mass spectrometry.

SUMMARY

In one aspect, a high-voltage power supply system for use in a mass spectrometer is disclosed, which comprises a ground-referenced voltage power supply having a first transformer comprising a primary winding and a secondary winding, said primary winding being electrically coupled to a first source of AC power, and a floated bias voltage power supply having a second transformer comprising a primary winding and a secondary winding, said primary winding of said second transformer being electrically coupled to a second source of AC power. A return electrical path of said floated bias power supply is electrically coupled to said ground-referenced power supply so as to bias an output voltage of the ground-referenced power supply. Further, a floating shield is disposed around the floating bias voltage power supply, and at least one resistive element is disposed in the return electrical path of the floated bias voltage power supply to reduce noise coupled from the floated bias voltage power supply to said ground-referenced voltage power supply.

The floating shield can provide a low AC impedance path from the return electrical path of the floated voltage power supply to the ground.

The resistive element disposed in the return electrical path can be coupled in series with a capacitance associated with the floating shield so as to enhance impedance of the return electrical path. In some embodiments, the resistive element can have a resistance in a range of about 10 kΩ to about 1 MΩ, e.g., in a range of about 100 kΩ to about 500 kΩ. In some embodiments, the capacitance associated with the floating shield can be in a range of about 6 pF to about 100 nF, e.g., in a range of about 100 pF to about 50 nF.

In some embodiments, a Faraday shield is disposed in the transformer of the floated bias voltage power supply so as to reduce parasitic coupling between the secondary winding and the primary winding of the transformer. In some embodiments, the Faraday shield can reduce the coupling by a factor in a range of about 2 to about 100.

In some embodiments, the return electrical path is capacitively coupled to the ground via at least one capacitor. In some embodiments, such a capacitor can have a capacitance in a range of about 6 pF to about 100 nF.

In some embodiments, the ground-referenced power supply can provide an output voltage in a range of 0 to about 20 kV, e.g., in a range of about 0 to 10 kV.

In some embodiments, the floated bias voltage power supply can be coupled to an ion detector of the mass spectrometer for supplying a high voltage thereto.

In a related aspect, a mass spectrometer is disclosed, which includes a mass analyzer, an ion detector disposed downstream of said mass analyzer, and a high-voltage power supply system that is configured to apply a high voltage to the ion detector. The high-voltage power supply system can include a ground-referenced voltage power supply having a first transformer comprising a primary winding and a secondary winding, said primary winding being electrically coupled to a first source of AC power. The high-voltage power supply system can further include a floated bias voltage power supply having a second transformer comprising a primary winding and a secondary winding, said primary winding of said second transformer being electrically coupled to a second source of AC power. A return electrical path of the floated bias voltage power supply is electrically coupled to the ground-referenced voltage power supply so as to bias an output voltage of the ground-referenced power supply. A floating shield disposed around said floating bias power supply, and at least one resistive element is disposed in the return electrical path of the floated bias voltage power supply to reduce noise coupled from the floated bias voltage power supply to the ground-referenced voltage power supply.

Further understanding of various aspects of the present disclosure can be attained with reference to the following detailed description in conjunction with the attached drawings, which are described briefly below.

BRIEF DESCRIPTION OF THE DRAWINGS

FIG. 1 schematically depicts a high-voltage power supply system according to an embodiment of the present teachings, FIG. 2 schematically depicts selected portions of the high-voltage power supply system depicted in FIG. 1, FIG. 3 schematically depicts an example of a controller that can be employed to synchronize the phases of the AC voltages generated by the AC voltage sources applying AC voltages to the primary windings of the transformers of the floated bias voltage power supply and ground-referenced voltage power supply, and FIG. 4 schematically depicts a mass spectrometer in which a high-voltage power supply system according to the present disclosure can be employed.

DETAILED DESCRIPTION

The present disclosure provides methods and systems for reducing noise coupling between two high-voltage power supplies in an electrically floated configuration with applications to mass spectrometry. In such a configuration, one power supply return is referenced to electric ground and a second power supply uses the output of the other power supply as a return reference. It is commonly known that connecting two power supplies in such a way can have undesired effects, such as ripple or noise coupling from the floated power supply to the ground referenced power supply. Such ripple or noise can result in performance degradation in mass spectrometry systems. As discussed in detail below, the methods and systems of the present disclosure can significantly reduce such ripple or noise coupling and hence improve the performance of a high-voltage power supply system, for example, when used in a mass spectrometry system.

Figure 1:
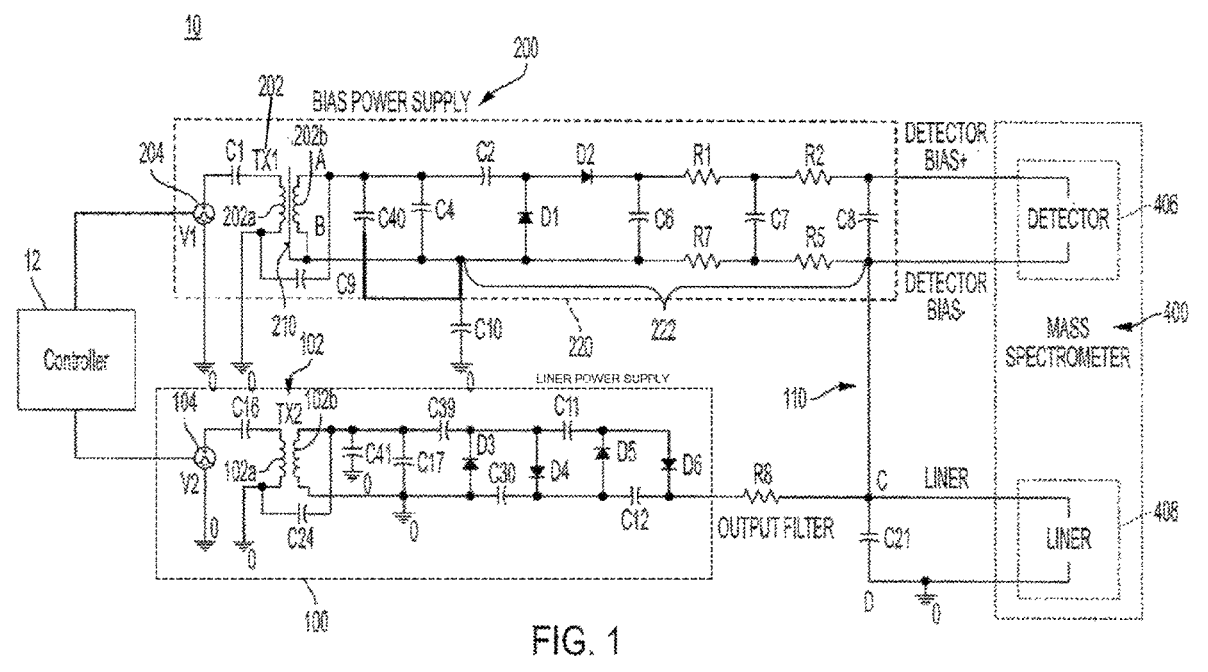
Figure 2:
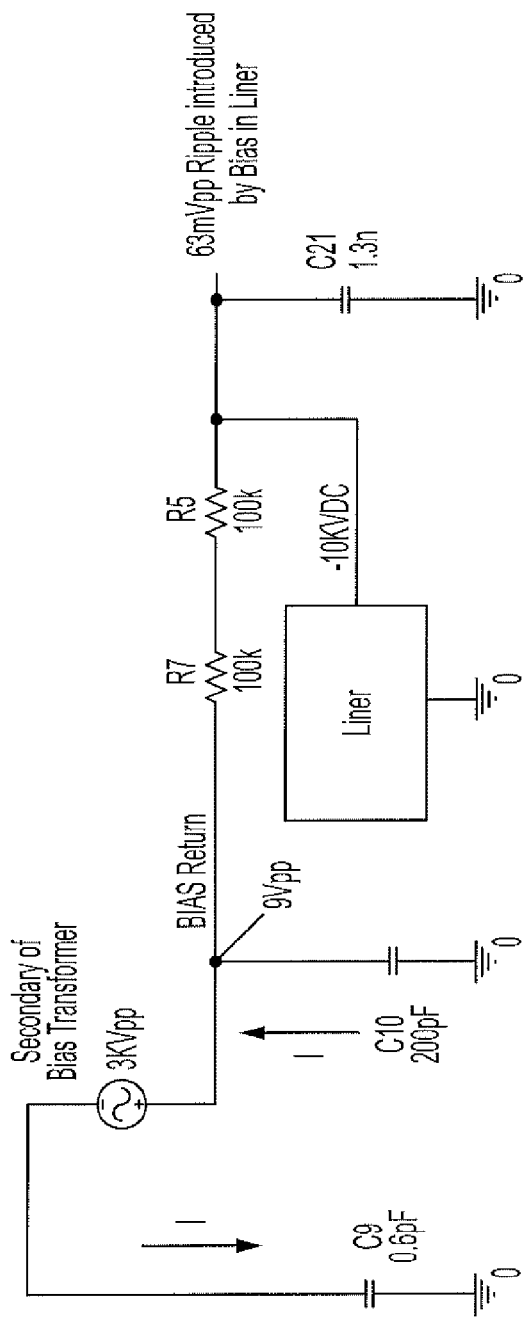

FIGS. 1 and 2 schematically depict a power supply system 10 according to an embodiment of the present disclosure, which includes a ground referenced voltage power supply 100 (herein also referred to as the ground-referenced power supply or liner power supply) and a floated voltage bias power supply 200 (herein also referred to as the bias power supply), which is electrically coupled to the ground referenced power supply 100 so as to apply a bias voltage thereto in a manner discussed in more detail below. The floated bias voltage power supply 200 can apply a bias voltage to an ion detector 406 of a mass spectrometer 400 and the liner power supply 100 can apply a voltage to liner elements 408 of the mass spectrometer, as discussed in more detail below.

The floated bias voltage power supply 200 includes a transformer 202, which includes a primary winding 202a and a secondary winding 202b. The primary winding 202a receives an AC (alternating current) voltage from an AC power source 204 via a capacitor C1. In this embodiment, the primary winding 202a of the transformer is coupled to the AC voltage source 204. The secondary winding of the transformer can step up the AC voltage applied by the AC source to the primary winding and apply the stepped-up voltage to downstream components of the floated bias voltage power supply, as discussed below.

In this embodiment, a Faraday shield 210 is disposed in the transformer of the floated bias voltage power supply between its primary and secondary windings to inhibit parasitic coupling between the primary and the secondary windings.

Further, a floating metal shield 220 is disposed around the bias voltage supply 200. As discussed in more detail below, the floating metal shield 220 provides a low-impedance path between one terminal of the secondary winding of the transformer of the floated bias voltage power supply to its other terminal, which can help inhibit noise current from returning to the second terminal via a path through the liner voltage supply.

The liner voltage power supply 100 also includes a transformer 102 that includes a primary winding 102a that receives an AC voltage from an AC voltage source 104 and a secondary winding 102b that steps up the voltage of the primary winding and applies the stepped up voltage to downstream components of the liner voltage power supply. In this embodiment, the primary winding 102a is coupled to the AC voltage source 104 via a capacitor C16.

With continued reference to FIGS. 1 and 2, an electrical connecting path 110 electrically connects the bias voltage power supply 200 to the ground referenced voltage power supply 100 to allow application of a bias voltage by the floated bias voltage supply to the ground referenced voltage power supply. In this embodiment, the electrical connecting path 110 includes a return electrical path 222 of the floated bias voltage power supply, which is herein referred to as "a return electrical path."

The electrical connecting path 110 extends from terminal A of the secondary winding 202b of the transformer of the floated bias voltage power supply 200 via parasitic capacitor C9 to electrical ground, and through electrical ground to terminal D of a capacitor C21 associated with the liner power supply. The connecting path 110 further extends from terminal C of the capacitor C21 via the return electrical path 222 of the floated bias voltage power supply to terminal B of the secondary winding of the transformer of the floated bias voltage power supply.

In this embodiment, two resistive elements R5 and R7 are disposed in the return electrical path of the floated bias voltage power supply to mitigate the noise injected from the floated bias voltage power supply into the liner power supply. Although in this embodiment two resistive elements are depicted, in other embodiments, one or more than two resistive elements may be employed. In some embodiments, the resistance of the combination of the resistive elements R5 and R7 can be, for example, in a range of about 10 kΩ to about 1 MΩ, e.g., in a range of about 100 kΩ to about 500 kΩ, or in range of about 200 kΩ to about 400 kΩ.

In some embodiments, the resistive elements R5 and R7 disposed in the return path of the floated bias voltage power supply can reduce the noise injected by the floated bias voltage power supply to the liner power supply by a factor in a range of about 20 to about 100, e.g., in a range of about 30 to about 90, or in a range of about 40 to about 80, or in a range of about 50 to about 70. By way of example, the resistive elements R5 and R7 help reduce the noise injected from the floated bias voltage power supply to the liner power supply to a level less than about 60 mVpp (millivolts peak-to-peak).

The role of various elements according to the present disclosure for reducing noise coupling between the floated bias voltage power supply and the liner power supply can be further understood by considering that an inherent property of a voltage transformer is a parasitic coupling between its primary and secondary windings. Such a parasitic coupling between the primary and the secondary windings of the transformer of the floated bias voltage power supply is depicted herein as a capacitor C9, and a respective parasitic coupling between the primary and the secondary windings of the transformer of the liner power supply is herein represented by a capacitor C24. Further, an inherent side effect of placing the floated bias voltage power supply within the metal floating shield 220, which is connected to return of bias transformer TX1 terminal, is the presence of a parasitic capacitance between terminal A of the secondary winding of the transformer of the floated bias voltage power supply and the enclosure. Such a parasitic capacitance is herein represented by a capacitor C40 and is in parallel to the secondary winding of transformer 202.

A capacitive coupling between the secondary winding of the liner transformer and the ground is herein represented by a capacitor C41.

In the liner power supply, capacitors C24 and C41 are electrically connected in parallel with the inter-winding capacitor C17, which is significantly larger than C24 and C41. These capacitors slightly increase the capacitive load on transformer TX2 but do not produce any undesirable effects on the circuit's functionality.

In contrast, in the floated bias voltage power supply, the capacitor C9 presents a path for a voltage signal present at terminal A of the secondary winding 202b of the transformer 202 of the bias voltage power supply to the ground. Such a path allows AC currents through C9 to flow to ground. If resistors R7 and R5 were not present, a current would return, via C9, to terminal B of the secondary winding of transformer 202 via capacitors C10 and C21, which are connected in parallel (See, FIG. 2). More specifically, most of such AC currents would return to terminal B of the secondary winding of the bias voltage transformer 202 via capacitor C21 of the liner voltage power supply since C21 has a much larger capacitance compared to C10. Such AC current can hence generate an AC voltage ripple across capacitor C21. In general, the impedance of capacitor C21 is much lower than those of capacitors C9 and C10. For example, typical impedances of C21, C10, and C9 are as follows: C21 is about 1400 Ohms, C10 is about 10 kOhms and C9 is greater than about 1 MOhms. Nonetheless, due to typical high amplitude signals present at terminal A of the secondary winding of the transformer of the floated bias voltage power supply, and the C9/C21 divider configuration, the current that circulates along this path can generate an AC voltage ripple across C21 of a magnitude that will undesirably appear at the output of the liner power supply.

In order to reduce the AC current circulating across C21, resistors R5 and R7, which exhibit high resistances, are added in the return path 222 between C10 and C21. By adding these resistors, most of the current via C9 is forced to return to terminal B of transformer 202 via C10, which is the capacitance of the floating shielding box, to ground. The AC voltage on terminal A of transformer 202 can develop a ripple voltage on C10, which is attenuated by the ratio C10/C9 and is further attenuated by the filtering action of network R7+R5 and C21.

The use of the transformer Faraday shield 210, the floating metal shield 220, and the current reducing resistors R5 and R7, can reduce the magnitude of the undesired current injected via the bias voltage supply into the liner power supply. In particular, in some embodiments, the transformer Faraday shield can reduce the capacitance of capacitor C9 by a factor, e.g., in a range of about 5 to 10, which can in turn increase the impedance of C9 and lower the magnitude of current returned through this capacitor, thus reducing magnitude of an undesired ripple at the output of the liner power supply.

The capacitance to ground (C10) of the floating metal shield 220 can in turn provide an alternate low impedance path from terminal B of the secondary winding of the floated bias voltage power supply for the current flowing through capacitor C9. Resistors R7 and R4 will advantageously reduce, and preferably inhibit, the current flowing through capacitor C21, therefore reducing the voltage ripple on the liner.

As discussed above, the floating metal shield 220 will add a parasitic capacitor C10 to the ground. This capacitor will create a new path for the current flowing through capacitor C9 to return to terminal B of the secondary winding of the transformer of the floated bias voltage power supply via a path exhibiting much larger impedance (e.g., larger by a factor in a range of about 10 to about 20 times) than the impedance exhibited by the path extending from C9 to C21. Consequently, the capacitor C10 will not considerably increase the magnitude of voltage ripple across C21. Further, the resistive elements R5 and R7 increase the impedance of the return path 222 (e.g., from a few kΩ to about hundreds of kΩ) and hence result in reducing the magnitude of a voltage ripple across capacitor C21, e.g., by a 10 to 100 times, and in some cases more. In other words, in many embodiments, the current flowing through capacitor C9 will use capacitor C10 as the return path and hence most of any voltage ripple will occur across capacitor C10, which is not present at the output of the liner voltage supply.

Further, in some embodiments, the phases of the AC signals applied by the AC voltage sources 104 and 204 to the transformers 102 and 202 of the bias voltage supply and the ground-referenced voltage supply, respectively, can be synchronized such that a voltage ripple generated by the floated bias voltage power supply 200 will be subtracted from a voltage ripple generated by the liner power supply, thus resulting in an overall ripple reduction at the output of the liner power supply.

Figure 3:
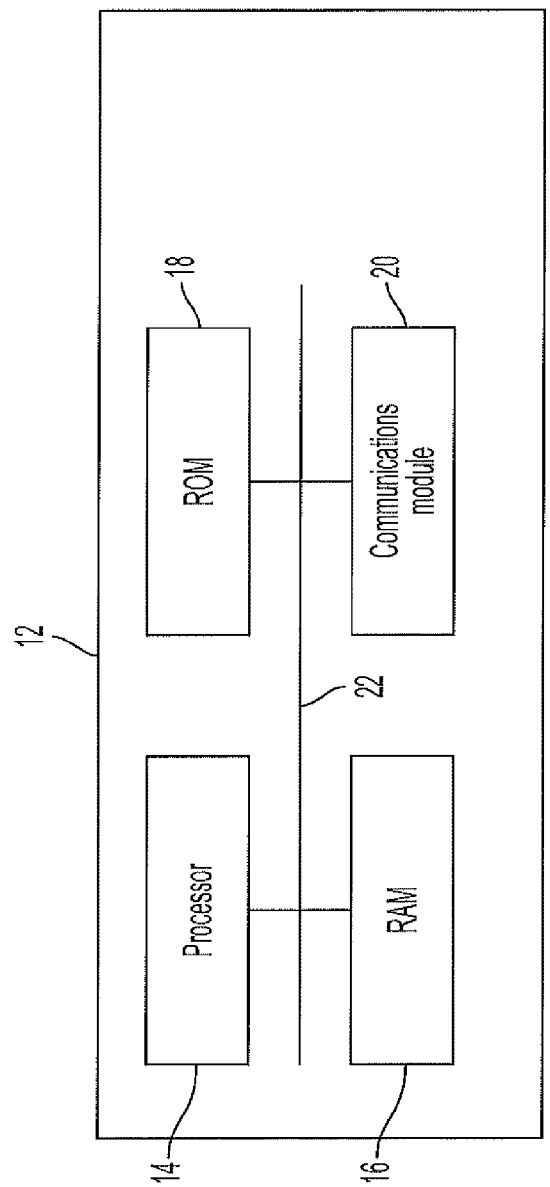

By way of example and with reference to FIG. 1, a controller 12 in communication with the AC voltage sources 104 and 204 can synchronize the phases of the AC voltages generated by those voltage sources so as to ensure that a voltage ripple generated by the floated bias voltage power supply 200 will be subtracted from a voltage ripple generated by the liner voltage supply 100. The controller 12 can be implemented in hardware, firmware and/or software using techniques known in the art informed by the present disclosure. By way of example, FIG. 3 schematically depicts an example of implementation of such a controller 12, which includes a processor 14, a random access memory (RAM) 16, a read-only memory (ROM) 18, and a communications bus 20, which allows communication between the processor and the other components. The controller 12 can further include a communications module 22 that allows communication between the controller 12 and the AC voltage sources 104 and 204. Instructions for synchronizing the phases of the AC voltages can be stored in the ROM 18 and be transferred by the processor at runtime to the RAM 16 for execution.

Referring again to FIG. 1, in the floated bias voltage power supply, the capacitors C2 and C6 together with the diodes D1 and D2 form a conventional two-times voltage multiplier, which can reduce the demand on the transformer 210 of the floated bias voltage power supply for multiplying the AC voltage applied to its primary winding. The floated bias voltage power supply 200 further includes a filter, which is formed by resistors R1 and R2 as well as capacitors C7 and C8. The filter is a differential filter that reduces a differential voltage at the output of the bias power supply.

With continued reference to FIG. 1, the liner power supply 100 includes a four-times voltage multiplier that is formed by diodes D3, D4, D5, and D6 and capacitors C39, C30, C11 and C12, which collectively provide a conventional multiplier configuration. The four-times voltage multiplier reduces the demand on the transformer 100 of the liner power supply for amplifying the voltage applied to the primary winding of the transformer of the liner power supply by the AC voltage source 104.

As noted above, a high-voltage power supply system according to the present disclosure can be employed in a variety of mass spectrometers, such as those having a time-of-flight mass analyzer, a quadrupole mass analyzer, among others. By way of example, such a high-voltage power supply system can be used to provide ion acceleration and/or to apply the requisite voltages to an ion detector of a mass spectrometer.

Figure 4:
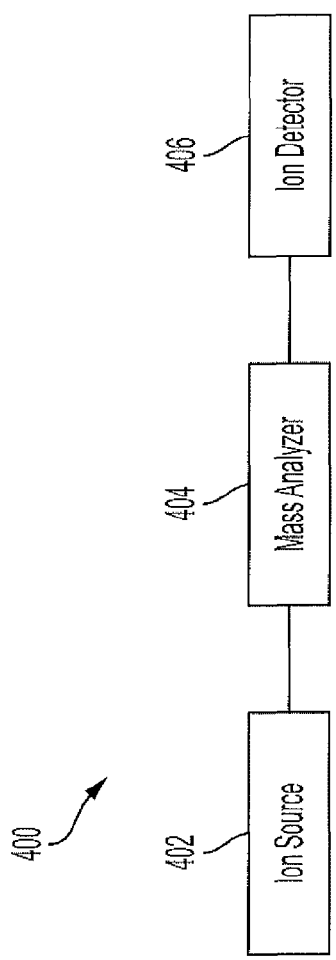

By way of illustration, with reference to FIG. 4 as well as FIG. 1, a mass spectrometer 400 according to an embodiment of the present disclosure can include, among other elements, an ion source 402 for generating ions, a mass analyzer 404 for analyzing the ions and an ion detector 406 for detecting the ions. In this embodiment, the high-voltage power supply system 100 can apply a bias voltage to the ion detector of the mass spectrometer and a bias voltage to the liner elements of the mass spectrometer. More specifically, as depicted in FIG. 1, in this embodiment, the output voltage of the floated bias voltage power supply is employed to bias the ion detector and the output voltage of the ground-referenced voltage power supply is employed to bias the liner elements of the mass spectrometer.

The mass analyzer 404 can be any suitable mass analyzer employed in mass spectrometry systems known in the art. By way of example, the mass analyzer 404 can be a time-of-flight mass analyzer, a quadrupole mass analyzer, a tandem quadrupole-quadrupole mass analyzer, among others.

Those having ordinary skill in the art will appreciate that various changes can be made to the above embodiments without departing from the scope of the invention.

What is claimed is:

1. A high-voltage power supply system for use in a mass spectrometer, comprising:
    a ground-referenced power supply having a first transformer comprising a primary winding and a secondary winding, said primary winding being electrically coupled to a first source of AC power,
    a floated bias voltage power supply having a second transformer comprising a primary winding and a secondary winding, said primary winding of said second transformer being electrically coupled to a second source of AC power,
    wherein a return electrical path of said floated bias voltage power supply is electrically coupled to said ground-referenced power supply so as to bias an output voltage of said ground-referenced power supply,
    a floating shield disposed around said floated bias voltage power supply, and
    at least one resistive element disposed in said return electrical path of said floated bias voltage power supply to reduce noise coupled from said floated bias voltage power supply to said ground-referenced power supply.

2. The high-voltage power supply system of claim 1, wherein said floating shield provides a low AC impedance path from said return electrical path of said floated bias voltage power supply to the ground.

3. The high-voltage power supply system of claim 2, wherein said at least one resistive element is coupled in series with a capacitance associated with said floating shield so as to enhance impedance of said return electrical path.

4. The high-voltage power supply system of claim 3, wherein said at least one resistive element has a resistance in a range of about 10 kΩ to about 1 MΩ.

5. The high-voltage power supply system of claim 4, wherein said at least one resistive element has a resistance in a range of about 100 kΩ to about 1 MΩ.

6. The high-voltage power supply system of claim 3, wherein said capacitance associated with said floating shield is in a range of about 6 pF to about 100 nF.

7. The high-voltage power supply system of claim 6, wherein said capacitance associated with said floating shield is in a range of about 100 pF to about 50 nF.

8. The high-voltage power supply system of claim 1, further comprising a Faraday shield disposed in said second transformer so as to reduce parasitic coupling between the secondary winding and the primary winding of said second transformer.

9. The high-voltage power supply system of claim 8, wherein said Faraday shield reduces said coupling by at least about 2 pF.

10. The high-voltage power supply system of claim 8, wherein said Faraday shield reduces said coupling by a factor in a range of about 2 to about 100.

11. The high-voltage power supply system of claim 1, wherein said return electrical path is capacitively coupled to the ground via at least one capacitor.

12. The high-voltage power supply system of claim 1, wherein said ground-referenced power supply provides an output voltage in a range of about 0 to about 20 kV.

13. The high-voltage power supply system of claim 10, wherein said floated bias voltage power supply provides a bias voltage in a range of about 0 to about 10 kV.

14. The high-voltage power supply system of claim 1, wherein said floated bias voltage power supply is coupled to an ion detector of said mass spectrometer to apply a bias voltage thereto.

15. A mass spectrometer, comprising:
    a mass analyzer,
    an ion detector disposed downstream of said mass analyzer, and
    a high-voltage power supply system configured to apply a high voltage to said ion detector,
    wherein said high-voltage power supply system comprises:
        a ground-referenced power supply having a first transformer comprising a primary winding and a secondary winding, said primary winding being electrically coupled to a first source of AC power,
        a floated bias voltage power supply having a second transformer comprising a primary winding and a secondary winding, said primary winding of said second transformer being electrically coupled to a second source of AC power,
        wherein a return electrical path of said floated bias voltage power supply is electrically coupled to said ground-referenced power supply so as to bias an output voltage of said ground-referenced power supply,
        a floating shield disposed around said floating bias power supply, and
        at least one resistive element disposed in said return electrical path of said floated bias voltage power supply to reduce noise coupled from said floated bias voltage power supply to said ground-referenced power supply.

16. The mass spectrometer of claim 15, wherein said floating shield provides a low AC impedance path from said return electrical path of said floated bias voltage power supply to the ground.

17. The mass spectrometer of claim 15, wherein said at least one resistive element is coupled in series with a capacitance associated with said floating shield so as to enhance impedance of said return electrical path.

18. The mass spectrometer of claim 17, wherein said at least one resistive element has a resistance in a range of about 10 kΩ to about 1 MΩ.

19. The mass spectrometer of claim 18, wherein said capacitance associated with said floating shield is in a range of about 6 pF to about 100 nF.

20. The mass spectrometer of claim 15, wherein said return electrical path is capacitively coupled to the ground via at least one capacitor.

\* \* \* \* \*